United States Patent [19]
Gleason

[11] Patent Number: 5,203,819
[45] Date of Patent: Apr. 20, 1993

[54] APPARATUS FOR ATTACHING A FITMENT TO A WEB OF FILM

[75] Inventor: Byron Gleason, Algonquin, Ill.

[73] Assignee: Baxter International Inc., Deerfield, Ill.

[21] Appl. No.: 924,418

[22] Filed: Jul. 30, 1992

Related U.S. Application Data

[63] Continuation of Ser. No. 520,148, May 7, 1990, abandoned, which is a continuation of Ser. No. 443,056, Nov. 28, 1989, abandoned, which is a continuation of Ser. No. 819,648, Jan. 17, 1986, abandoned.

[51] Int. Cl.⁵ .................. B65B 61/00; B65B 51/14
[52] U.S. Cl. .................. 53/133.2; 156/583.1; 156/581; 493/87
[58] Field of Search ........... 53/133.2, 329.3; 83/15, 83/170, 171; 156/583.1, 252, 513, 580, 581; 219/243; 493/212, 213, 214, 87; 264/548

[56] References Cited

U.S. PATENT DOCUMENTS

| | | |
|---|---|---|
| 3,069,303 | 12/1962 | Scholle . |
| 3,159,695 | 12/1964 | Behringer ........................ 264/548 |
| 3,244,576 | 4/1966 | Swartz . |
| 3,423,271 | 1/1969 | Kallert et al. .................... 156/513 |
| 3,425,887 | 2/1969 | Bowen . |
| 3,434,908 | 3/1969 | MacDonald . |
| 3,490,979 | 1/1970 | Calvert et al. . |
| 3,759,013 | 9/1973 | Zimmerman ..................... 53/373 |
| 3,760,563 | 9/1973 | Zimmerman ..................... 53/373 |
| 3,783,080 | 1/1974 | Goglio . |
| 3,812,572 | 5/1974 | Weikert . |
| 3,821,046 | 6/1974 | Runge . |
| 3,868,891 | 3/1975 | Parish . |
| 3,909,340 | 9/1975 | Selbeck . |
| 4,055,032 | 10/1977 | Hammond . |
| 4,120,134 | 10/1978 | Scholle . |
| 4,166,412 | 9/1979 | Versteege . |
| 4,245,062 | 1/1981 | Christine . |
| 4,326,574 | 4/1982 | Pallaroni . |
| 4,398,883 | 8/1983 | Vetter et al. ..................... 264/548 |
| 4,451,249 | 5/1984 | deBin . |

Primary Examiner—Horace M. Culver
Attorney, Agent, or Firm—Paul E. Schaafsma; Amy L. H. Rockwell; Paul C. Flattery

[57] ABSTRACT

An improved apparatus is disclosed for attaching a fitment (13) to a web of film (20), including a heat seal tip (32) for piercing a web of film (20), for use in the manufacture of flexible plastic containers. The fitment (13) provides a means of access between the interior of the container and the outside environment.

20 Claims, 2 Drawing Sheets

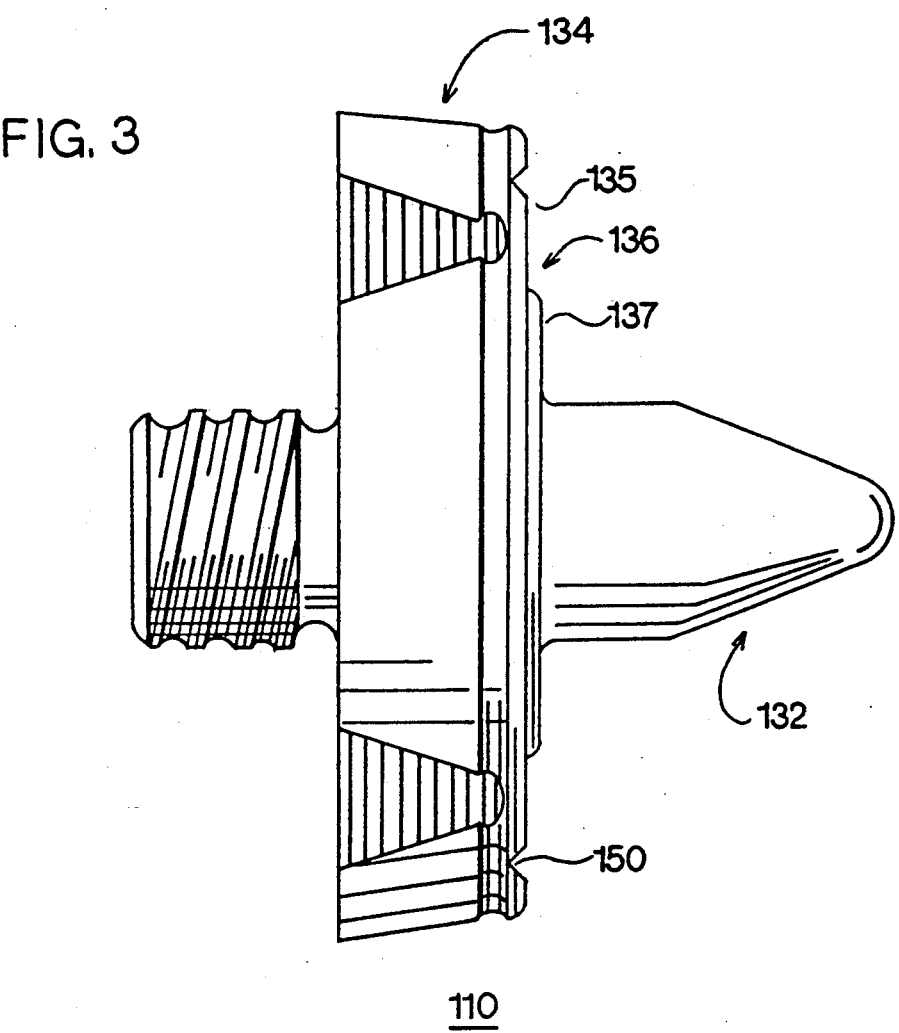

APPARATUS FOR ATTACHING A FITMENT TO A WEB OF FILM

This is a continuation of application Ser. No. 07/520,148, filed on May 7, 1990, now abandoned, which is a continuation of application Ser. No. 07/443,056, filed on Nov. 28, 1989, now abandoned, which is a continuation of the parent application Ser. No. 06/819,648, filed Jan. 17, 1986, now abandoned.

BACKGROUND OF THE INVENTION

The present invention relates to an apparatus for attaching a fitment to a web of film. In particular, the present invention relates to an improved apparatus for piercing and sealing a web of film to a fitment.

In some types of packaging arts including, inter alia, pharmaceutical, food products, and dairy products, it is desirable to make flexible containers that include means for accessing the container (hereinafter "fitments"). As used herein, the term fitment includes, without limitation, valves, ports, port enclosure assemblies, and other means for accessing a container. Fitments provide ports for establishing fluid communication between the container and the outside environment. An example of a container utilizing a fitment is the VIAFLEX ® flexible container for parenteral solutions produced by Travenol Laboratories, Inc. of Deerfield, Ill.

Flexible containers with fitments may be produced by form, fill and seal packaging machines. Form, fill and seal packaging machines provide an apparatus for forming a web of film into a flexible container housing a desired product. Typically, these machines include a former or mandrel, a fill tube, and heat sealers. The former or mandrel forms the web of film into a tubular shape around the fill or film tube. The fill tube is utilized to dispense the material to be packaged into the tubular shaped web of film.

In one type of form, fill and seal packaging machine, the fitments are attached via an impulse heat sealing system. Usually impulse heat sealing systems utilize a ring heating element that has a shape substantially similar to the flange portion of the fitment. In an impulse type system, the ring member is not constantly heated but rather, heated for a sufficient length of time to provide the ring member with enough heat energy to cause the web of film to melt and fusion seal to the fitment flange.

Depending upon its end use, the web of film, to which the fitment is attached, may or may not include a prepierced hole. In the typical "bag in a box" box design, the film is typically prepierced. To this end, the web of film is prepierced and the fitment is located over the prepierced hole so that there is fluid communication between the fitment and the container. The prior art has also utilized a method of passing a fitment through the prepierced hole. Both these methods require that the fitment is located with precision over, or in, the prepierced hole, slowing down the production of the flexible containers.

U.S. patent application Ser. No. 697,534 entitled "Apparatus and Method for Attaching a Fitment to A Web of Film" and filed in the name of William Christine discloses an apparatus for contemporaneously piercing and sealing the web of film to the fitment. The present invention provides an improved apparatus for piercing and sealing the web of film to the fitment.

SUMMARY OF THE INVENTION

The present invention provides an improved heat sealer for an apparatus for piercing and sealing a web of film to a fitment. The heat sealer includes an abutment member having a heated face. Extending from the heated face is a heat seal tip. The heated face includes a flat area and a raised area.

Preferably, the heated face includes a groove and the abutment member includes flats. The abutment member may include a radius defined by an under cut.

Accordingly, an advantage of the present invention is to provide an improved apparatus for piercing and sealing a web of film to a fitment in a form, fill and seal packaging machine.

A further advantage of the present invention is that the apparatus for piercing and sealing the web of film produces a strong heat seal between the web of film and the fitment.

Moreover, an advantage of the present invention is that the heat sealer of present invention produces an effective heat seal on the flange of the fitment.

Furthermore, an advantage of the present invention is that the heat sealer can utilize lower heat seal temperatures.

A still further advantage of the present invention is that the heat sealer provides improved alignment of the sealing pin and fitment.

Another advantage of the present invention is that the heat sealer may include a radius and undercut to prevent draping of the film.

Furthermore, an advantage of the present invention is that the heat sealer may include a groove to prevent air entrapment between the heat sealer and the web of film.

Moreover, an advantage of the present invention is that the heat sealer may include flats to improve the ability of the user to remove the heat sealer from the heat seal block.

Additional features and advantages are described in, and will be apparent from, the detailed description of the presently preferred embodiments and from the drawings.

BRIEF DESCRIPTION OF THE DRAWINGS

FIG. 3 illustrates a perspective top elevational view of a further embodiment of the heat sealer of the present invention.

DETAILED DESCRIPTION OF THE PRESENTLY PREFERRED EMBODIMENTS

Figure 1:
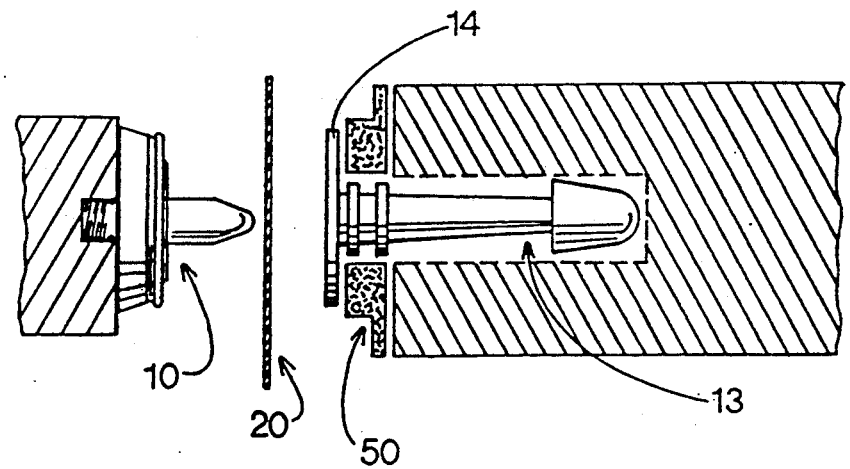
FIG. 1 illustrates a side elevational view of the apparatus for piercing and sealing of the present invention.

FIG. 1 illustrates an embodiment of the heat sealer 10 of the present invention. The heat sealer 10 functions to attach a fitment 13 to a web of film 20. This allows one in a form, fill and seal packaging machine to create a container having a fitment 13. As used herein, the term "form, fill and seal packaging machine" means packaging machines for creating from a web of film a container that houses a product.

The heat sealer 10 of the present invention is designed to be preferably utilized with the apparatus and method for attaching a fitment to a web of film described in U.S. patent application Ser. No. 697,534 entitled "Apparatus and Method for Attaching a Fitment to a Web of Film" filed in the name of William Christine. The disclosure of this patent application is incorporated herein by reference.

Figure 2:
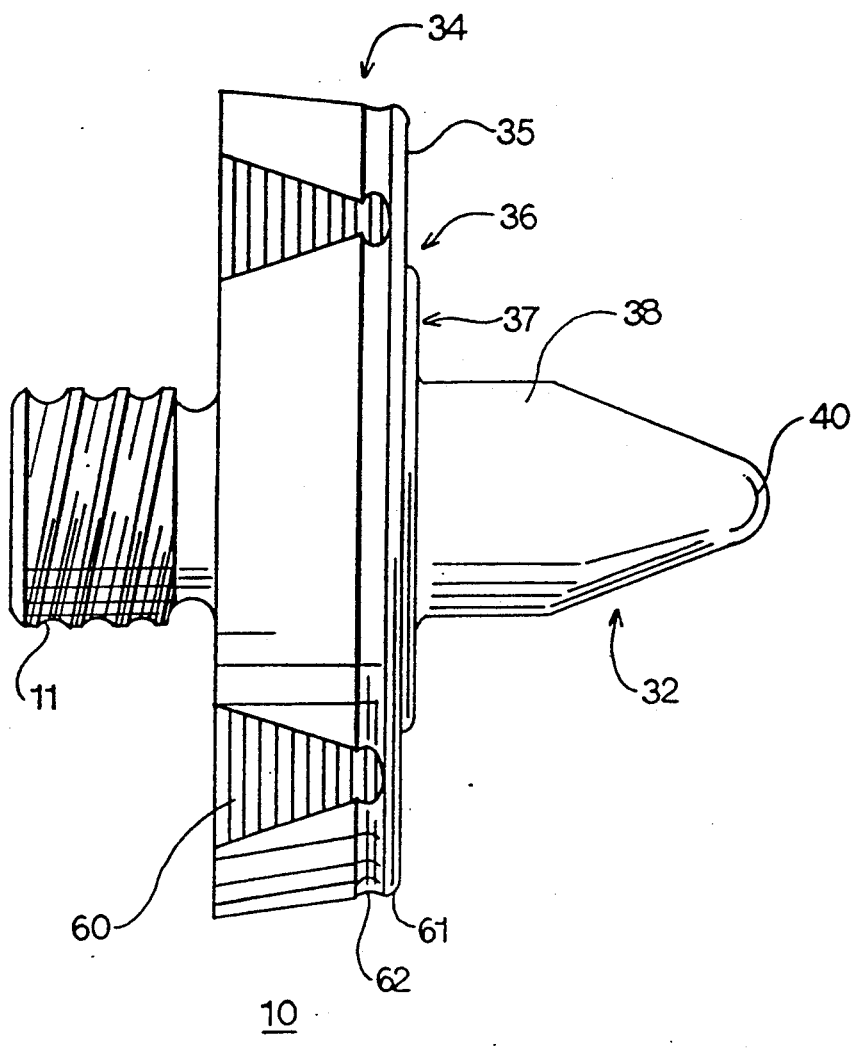
FIG. 2 illustrates a perspective view of the heat sealer of FIG. 1.

To this end, as illustrated in FIG. 1 and 2, the heat sealer 10 includes a threaded portion 11 that is designed to be received within a heat seal block 12 that includes a cartridge heater (not illustrated) and thermocouple (not illustrated). The heat seal block 12 is then secured to a support block on the fill tube as described in U.S. patent application Ser. No. 697,534.

Referring to FIG. 2, the heat sealer 10 includes a heat seal tip 32 and an abutment member 34. The abutment member 34 includes a face 36. As illustrated, the face 36 of the abutment member 34 includes a flat region 35 and a raised region 37.

The raised region 37 insures that a strong heat seal is created between the fitment 13 and the web of film 20 across the entire surface of the flange 14 of the fitment. The raised region 37 compensates for the flexing of the fitment 13 as the web of film 20 is sealed to the fitment 13.

Preferably the raised region 37 extends from the lower portion 35 of the face 36 of the abutment member 34 by approximately 1/1000 to about 15/1000 of an inch and most preferably extends by approximately 5/1000 of an inch. It should be noted that it is possible to construct the heat sealer 10 so that the face 36 is flat across its entire surface and does not include the raised region 37. However, the raised region 37 is desirable in that, due to the increased height of the raised region 37, the web of film 20 is securely sealed to the flange 14 of the fitment 13.

The raised region 37 preferably has a circumference equal to that portion of the flange 14 of the fitment 13 that is not backed up by the elastomeric back-up member 50 of the heat seal press heat 41. As discussed in detail in U.S. patent application Ser. No. 697,534, the heat seal press head 41 functions to urge the fitment 13 towards the web of film 20 and thereby the heat sealer 10. Due to the construction of the fitment 13, the portion of the fitment 13 that is not backed up by the back-up member 50 has sufficient structural rigidity and therefore does not need the back-up member 50 supporting it.

The heat seal tip 32 includes an elongated body 38 and point 40. Preferably the point 40 has a conical shape. Preferably the angle of the vertex of the point 40 is between approximately 40 to about 55 degrees. Preferably the angle of the vertex is approximately 45 degrees. Preferably the point 40 is radiused off to insure that it is not too sharp.

The length of the heat sealer can be an important dimension. Preferably the length of the heat sealer 10 from its back portion 31 to the tip 40 is approximately 550/1000 to about 650/1000 of an inch for a web of film with a thickness of approximately 100 microns to about 200 microns.

Preferably the heat sealer 10 is constructed from a metal, e.g., aluminum. It has been found that 6061 aluminum functions satisfactorily. Preferably the aluminum is bright polished and coated with an anodized teflon impregnated coating. An anodized teflon impregnated coating sold under the name Nituff by Nimet Industries has been found to function satisfactorily. The teflon coating provides a better wear for the heat sealer 10 and also provides a surface that can be easily cleaned of the plastic buildup. Moreover, the coating prevents denting of the heat sealer 10.

Preferably, the heat sealer 10 includes flats 60. The flats 60 provide a means to aid the user in removing the heat sealer 10 from the heat seal block. Because the heat sealer 10 is heated during use, the threads 11 may deform due to the heat. Accordingly it may be difficult to remove the heat sealer 10 from the heat seal block. The flats 60 provide a means for utilizing a mechanical advantage to remove the heat sealer 10.

Preferably, the elongated body 38 of the heat seal tip 32 has an outer diameter that is approximately 0.002 inches to about 0.004 inches larger than the inner diameter of the opening in the fitment 13. This can be an important dimension because if the diameter is too large the heat seal tip 32 will be difficult to remove from the shaft of the fitment 13 after the web of film 20 has been sealed to the fitment. If the outer diameter of the heat seal tip 32 is too small then it will be difficult to get proper alignment with respect to the fitment 13 and web of film 20.

Preferably, the heat sealer 10 includes a radius 61 and undercut 62. The radius 61 and undercut 62 prevent draping of the film 13 as it is sealed to the fitment 13. Without the radius 61 and undercut 62 the film 20 can be pushed down around the side of the abutment member 34 by the back-up member 50 causing the film to weaken at this point. The radius 61 and undercut 62 function to radius away the film 20 from contact with the heat sealer 10. Preferably, the radius 61 has a cross-sectional width of approximately 20/1000 to about 35/1000 of an inch. It has been found that if the radius has a thickness of approximately 27/1000 of an inch it functions satisfactorily. Preferably the undercut 63 is between approximately 10/1000 to about 30/1000 of an inch deep. It has been found that if the undercut is approximately 20/1000 of an inch deep it functions satisfactorily.

FIG. 3 illustrates another embodiment of the heat sealer 110 of the present invention. As illustrated, the heat sealer 110 includes a heat seal tip 132 and an abutment member 134 that includes a face 136. The face 136 includes a raised region 137 and a lower region 135. Preferably, the raised region 137 has dimensions that are similar to those of the raised region 37 of the heat sealer 10 previously disclosed.

The lower region 135 may include a groove 150. The groove 150 functions to provide a means for allowing air that is entrapped during the sealing process between the face 135 of the heat sealer 10 and the web of film 20 to escape. Preferably the groove 150 is located between approximately 50/1000 to about 70/1000 of the inch from the circumferential edge of the face 136. Most preferably, the groove 150 is located 60/1000 of an inch from the circumferential edge of the face 136. It has been found that a groove 150 with a depth of approximately 1/1000 of an inch and a width of 1/1000 of an inch functions satisfactorily.

It should be understood that various changes and modifications to the preferred embodiments described herein and will be apparent to those skilled in the art. Such changes and modifications can be made without departing from the spirit and scope of the present invention and without diminishing its attendant advantages. It is therefore intended that such changes and modifications be covered by the appended claims.

We claim:

1. An apparatus for piercing and sealing a web of film to a fitment having a flange comprising:

an abutment member including a heated face having a generally flat lower portion and a generally flat raised portion, both the generally flat lower portion and the generally flat raised portion adapted to contact the web of film during sealing, the generally flat raised portion sized to contact the web against a portion of the flange adjacent the fitment; and a heat seal tip extending from the raised portion of the heated face.

2. The apparatus of claim 1 wherein the heated face lower area further defines a groove.

3. The apparatus of claim 1 including a radius circumscribing the heated face, the radius being defined by an undercut.

4. A heat sealer for piercing and sealing a web of film to a fitment having a flange comprising:

an abutment member including a heated face having a generally flat lower portion and a generally flat raised area, both the generally flat lower portion and the generally flat raised portion adapted to contact the web of film during sealing, the generally flat raised area sized to correspond to a portion of the flange which contacts a portion of the web which is contacted only by the heated face during sealing; and a heat seal tip extending from the raised area and corresponding to the fitment.

5. The heat sealer of claim 4 wherein the heated face includes means for releasing entrapped air.

6. The heat sealer of claim 5 wherein the means for releasing entrapped air includes at least one groove.

7. The heat sealer of claim 4 including means for attaching the heat sealer to heating means.

8. The heat sealer of claim 7 wherein the means for attaching is a threaded screw extending from a back of the abutment member.

9. The heat sealer of claim 4 wherein the heated face includes a lower area circumscribing the raised area.

10. The heat sealer of claim 9 wherein the lower area includes at least one groove.

11. The heat sealer of claim 4 wherein the heat seal tip includes a point having a vertex and the angle of the vertex is approximately 40 to about 55 degrees.

12. The heat sealer of claim 4 wherein the abutment member includes means for preventing the film from contacting the sides of the abutment member.

13. The heat sealer of claim 12 wherein the preventing means includes a radius and undercut.

14. A heat sealer for piercing and sealing a web of film to a fitment having a flange comprising:

an abutment member including a heated face having a generally flat lower portion and a generally flat raised area, the raised area being sized to correspond to a portion of the flange which contacts a portion of the web which is contacted only by the heated face during sealing, the abutment member further including means for aiding in the removal of the heat sealer from a heating means;

a heat seal tip extending from the raised area and corresponding to the fitment; and means for attaching the heat sealer to the heating means.

15. A heat sealer for piercing and sealing a web of film to a fitment comprising:

means for attaching the heat sealer to heating means;

an abutment member including a heated face having a raised area, and having flats circumscribing a portion of an outer circumference of the abutment member for aiding in the removal of the heat sealer from the heating means; and a heat seal tip extending from the heated face.

16. An apparatus for sealing a web of film to a fitment having a base comprising:

a fitment press head located on a first side of the web of film for urging the fitment towards the web of film, the fitment press head having a backup member for backing up a portion of the base of the fitment; and a heat sealer for piercing and sealing the web of film to the fitment, the heat sealer located on a second side of the web of film and having an abutment member including a heated face and a raised area having a circumference substantially equal to a circumference of a portion of the base not backed up by the backup member, the heated face having a heat seal tip extending therefrom.

17. The heat sealer of claim 16 wherein the heated face includes a lower area circumscribing the raised area.

18. The apparatus of claim 16 wherein the abutment member includes means for preventing the film from contacting the sides of the abutment member circumscribing an outer circumference of the abutment member.

19. The apparatus of claim 16 wherein the heated face includes means for releasing entrapped air.

20. The apparatus of claim 19 wherein the means for releasing entrapped air includes at least one groove.

* * * * *